United States Patent [19]

Schroeder et al.

[11] Patent Number: 4,781,508
[45] Date of Patent: Nov. 1, 1988

[54] FLUTED NAIL

[76] Inventors: Norman Schroeder, 4017 Mt. Blackburn, San Diego, Calif. 92111; Irving Ahlbeck, III, 930 Carriage Dr., San Marcos, Calif. 92069; Bradley Schroeder, 6646 Thornwood St., San Diego, Calif. 92111; Steven Stanwick, 180 Via La Paz, San Marcos, Calif. 92069

[21] Appl. No.: 37,627

[22] Filed: Apr. 13, 1987

[51] Int. Cl.⁴ .................................................. F16B 15/00
[52] U.S. Cl. ........................... 411/452; 411/482; 411/922; 52/410
[58] Field of Search ............ 411/452, 453, 454, 488, 411/482, 451, 446, 399, 922; 52/410

[56] References Cited

U.S. PATENT DOCUMENTS

| | | | |
|---|---|---|---|
| 325,859 | 9/1885 | Page | 411/451 |
| 451,213 | 4/1891 | Shepley | 411/482 |
| 519,810 | 5/1894 | Floyd | 411/452 |
| 747,171 | 12/1903 | Hass | 411/494 |
| 821,025 | 5/1906 | Davies | 411/452 |
| 1,242,924 | 10/1917 | Collings | 411/482 |
| 1,656,333 | 1/1928 | Lund | 411/452 |
| 1,767,565 | 6/1930 | Thrift et al. | 411/482 X |
| 2,114,451 | 4/1938 | Mattes | 411/482 X |
| 2,382,474 | 8/1945 | Gambo | 52/410 |
| 2,874,603 | 2/1959 | Boettcher | 411/482 |
| 4,370,840 | 8/1983 | Bisbee et al. | 52/410 |

FOREIGN PATENT DOCUMENTS

| 2465040 | 4/1981 | France | 52/410 |
|---|---|---|---|
| 1504 | of 1896 | United Kingdom | 411/452 |

*Primary Examiner*—Lloyd A. Gall
*Assistant Examiner*—Curtis B. Brueske
*Attorney, Agent, or Firm*—Brown, Martin, Haller & Meador

[57] ABSTRACT

A nail having a head and a shaft and a plurality of flutes extending from the head down the shaft and projecting outwardly from the axis of the shaft for a distance equal to the radius of the head. The nail is favorably employed in a device for automatically delivering the nail to affix soft material, particularly drywall, foam board and the like, to solid surfaces without disintegrating the material. The lower end of each flute is spaced from the nail head a distance substantially equal to the thickness of the soft material.

9 Claims, 1 Drawing Sheet

FLUTED NAIL

BACKGROUND OF THE INVENTION

The invention is in the field of construction materials.

A common problem associated with constructing buildings is that of affixing soft materials such as drywall, foam board or like material to a solid surface without damaging the material during affixation. While a variety of techniques are available to carry out this process, the most commonly used method is to simply drive a nail into and through the soft material that further penetrates into a solid material situated beneath the soft material. While a variety of nails can be used for this purpose, they all suffer from the limitation that they must be carefully hammered into the soft material lest they penetrate too deeply and cause the material to disintegrate. This problem is particularly common when nails are driven with pneumatic devices that pierce the drywall with enough force to disintegrate it.

The prior art shows a number of nails, bolts, and the like suitable for unique uses. None of these, however, show a nail that can be used to affix a soft material such as drywall, foam board or the like to a solid surface without damaging the material. For example, U.S. Pat. No. 519,810 shows a nail having a spike-like configuration that is utilized to engage rails that are positioned on a solid surface. Most often, the nail is utilized in the railroad construction industry. Further, U.S. Pat. No. 821,025 shows a nail having a pointed end, and a soft metal head. Beneath the head there are flutes that extend down the length of the shaft of the nail. The design of the nail makes it most effective in securing corrugated iron, and has no apparent application to the housing industry. Also, U.S. Pat. No. 1,656,333 shows a nail having three flanges or fins, that extend along the axis of the shank of the nail a distance equal to the radius of the head. The fins are coextensive radially with the head of the nail. The design of the nail permits it to be delivered from a machine without being driven obliquely into a solid surface. Finally, U.S. Pat. No. 4,482,795 shows a weld pin having ribs that radiate from the shank of the pin. The ribs function to radiate heat. The pin does not have flutes that emanate from the head of the pin.

It is apparent from a consideration of the prior art patents that they do not disclose a nail having a design that permits the nail to be driven into drywall, foam board or the like without causing these materials to disintegrate. Thus, it will be appreciated that there is a need for a nail having a design that permits it to be delivered from a machine, and driven through soft materials without damaging them.

SUMMARY OF THE INVENTION

The instant invention describes a fluted nail suitable for penetrating and affixing soft materials to an underlying solid surface without damaging these materials. Examples of soft materials are drywall, foam board, and the like, all of which are used extensively in the construction industry. A plurality of flutes are positioned beneath the head of the nail, and radiate outward from the shaft of the nail. While a nail having a minimum of two flutes is the preferred embodiment of the invention, nails having additional flutes are also within the scope of the invention.

The preferred embodiment has two flutes spaced on opposite sides of the shaft of the nail, and the length of the flutes differs depending on the thickness of the soft material to be penetrated by the nail. This feature of the invention prevents penetration of the nail head into the soft material. Put another way, the length of the flutes holds the nail head at about the outer surface of the soft material. Thus it will be appreciated that nails with flutes of different length can be employed for different applications depending on the thickness of drywall, foam board or like material, as well as the underlying solid surface to which these materials are affixed.

Lastly, it will be appreciated that another appealing feature of the instant invention is that the design of the preferred embodiment of the two-fluted nail is usable with available pneumatic nailing machines or electric or mechanical guns.

DETAILED DESCRIPTION OF THE INVENTION

Figure 1:
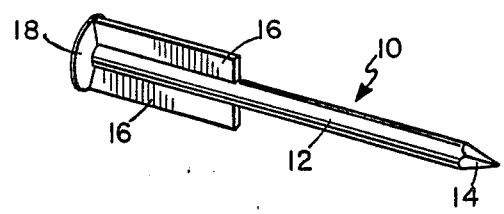
FIG. 1 is a perspective view of the fluted nail of the invention.

FIG. 1 shows the preferred embodiment of the instant invention. It consists of a nail 10 with a shaft 12 that is pointed at one end 14. While the pointed end 14 facilitates penetration of the nail into a solid object, it will be appreciated by those skilled in the art that this is an optional feature of the invention. In those instances where the degree of penetration required is not great, or if the material into which the nail is being driven offers marginal resistance to penetration, the end 14 may be blunted or rounded. A pair of flutes 16 are positioned on opposite sides of the shaft 12 and extend outwardly from the axis of the shaft 12 to a distance equal to or less than the radius of the head 18 of the nail.

Figure 2:
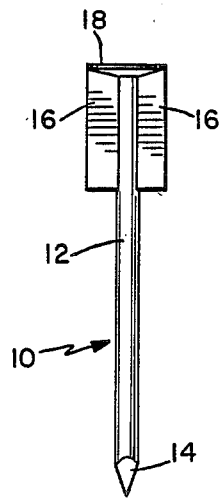
FIG. 2 is a side elevation view of the nail of FIG. 1.

FIG. 2 shows a side elevation view of the nail 10. It is particularly apparent that the flutes 16 extend from the head 18 down the shaft of the nail 12 with their width not exceeding the radius of the head 18.

Figure 3:
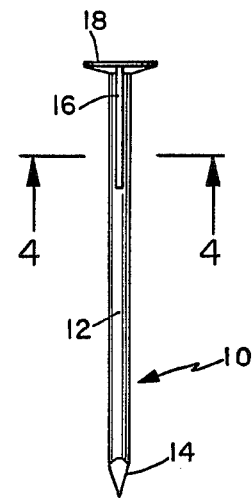
FIG. 3 is another side elevation view of the nail of FIG. 1 at right angles to FIG. 2.

FIG. 3 shows another side elevation view of the nail 10. One of the flutes 16 is shown situated on the shaft 12 and contacting the head of the nail 18. It will be appreciated that the flute is shown centered on the shaft 12 and that the thickness of the flute does not exceed the diameter of the shaft. While this design facilitates employing the nail with pneumatic, electric or mechanical guns that are used for delivering non-fluted nails, it will be appreciated that nails having wider flutes will also perform well when driven into drywall, foam board or similar material, although they may not be as compatible with the presently used pneumatic guns.

Figure 4:
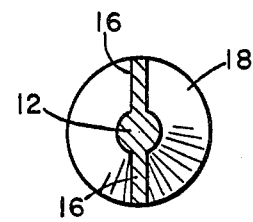
FIG. 4 is an enlarged sectional view taken on line 4—4 of FIG. 3.

FIG. 4 shows a cross-sectional view of the nail 10 taken along the line 4—4 of FIG. 3. The shaft 12 is shown transitioning to the flutes 16. The flutes 16 are coextensive radially with the head of the nail 18.

Figure 5:
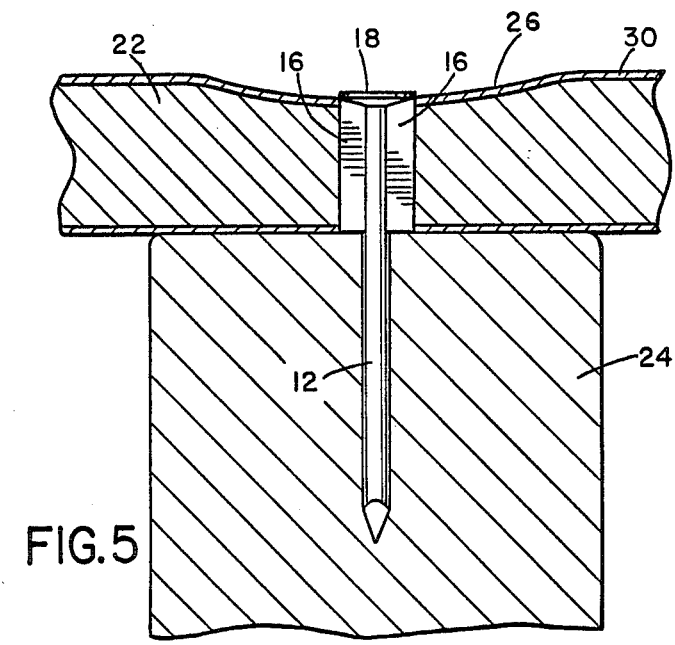
FIG. 5 shows the fluted nail of the invention being driven into drywall wherein the flutes abut against a solid surface with the shank of the nail driven therein.

FIG. 5 shows the nail of FIGS. 1-4 used to fasten a soft material 22 to a solid surface 24. The solid surface 24 can be composed of virtually any type of solid surface penetrable by the nail; however, most often it will consist of wood or wood-like material. Note also as shown in FIG. 5 that most often the nail 10 will be used to affix soft material having a planar surface 30. Upon penetration of the nail 10 into the soft material 22 a shallow depression 26 results. However, because of the flutes 16 the depression does not cause the soft material to disintegrate.

It will be appreciated from FIG. 5 that the length of the flutes 16 determines the depth to which the nail penetrates the soft material. For many applications, the flutes will be approximately one-half of five-eighths inch long, as these are the widths of the two most popular drywall materials currently manufactured. However, by no means should the instant invention be viewed as being restricted to nails having flutes with these lengths. What is disclosed herein is a means for fastening virtually any drywall or like material to a solid surface. It should be evident that this material can be virtually any thickness and still be affixed, provided that the length of the flutes is approximately equal to the width of the soft material. Thus, while drywall and foam board are most likely to be used with the invention, a wide range of such construction materials with varying widths may be utilized, including materials sold under the tradename R-Max.

It is anticipated that most often the nail of the invention will be utilized with a pneumatic gun or other automated means for delivering it. The preferred embodiment of the instant invention shown in FIGS. 1-4 presents a nail that is compatible with currently used devices. However, it will be appreciated that the nail described herein does not have to be employed with a machine, but is readily manually driven into the soft material.

A nail having the features described above but lacking the head 18 shown in FIG. 1 is a second embodiment of the instant invention. It will be appreciated that while the head 18 of the nail 10 facilitates mechanical or manual delivery of the nail, a headless fluted nail will also affix soft material to underlying solid material without splitting it.

Figure 6:
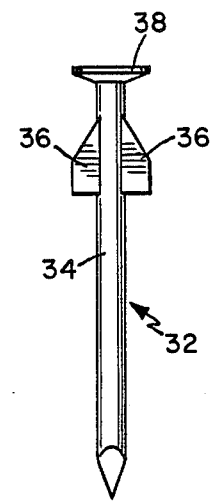
FIG. 6 is a side elevation view of a nail with an alternative fin configuration.

In addition to the preferred embodiment nail shown in FIGS. 1-5, a further embodiment is shown in FIG. 6. Therein is shown a side elevation view of a nail 32 having a shaft 34, and situated thereon are flutes 36 that radiate outward from the sides of the shaft and that are spaced about 180 degrees apart. The flutes project outwardly from the axis of the shaft for a distance equal to the radius of the head 38 of the nail. The configuration of the nail 32 in FIG. 6 reveals that it is not necessary to have the flutes radiate from the shaft 34 up to the head 38. Moreover, it further reveals that the flutes 36 can be tapered in the direction of the head 38. The latter reinforces the flutes, thereby increasing the strength to which they are affixed to the shaft 34. It will be appreciated by those skilled in the art that the nail 32 is equally capable of being delivered manually to affixed soft material, or by a pneumatic, electric, or mechanical gun.

It will be further appreciated that while the preferred embodiments of the instant invention are nails having two flutes that radiate outward from the sides of the shaft of the nail and that are spaced about 180 degrees apart, a variety of flutes having different shapes will also perform satisfactorily. Moreover, it is to be anticipated that, as alluded to above, nails having more than two flutes can also be employed.

It will be appreciated that although the foregoing invention has been described in some detail by way of illustration and example, for purposes of clarity of understanding, it will be obvious that certain changes and modifications may be practiced within the scope of the appended claims.

We claim:

1. A nail for securing a soft material layer to a solid surface, comrising a shaft, a head extending radially around said shaft, and at least two flutes, each flute having an axially extending constant radius portion, said head having a substantially greater radial cross-sectional area that said flutes, and said flutes extending radially from the surface of said shaft for a distance no greater than the radius of said head, the bottom edge of said flute being substantially perpendicular to said shaft and spaced from said nail head a distance approximately equal to the thickness of said soft material layer.

2. A nail as described in claim 1 wherein said two flutes are spaced about 180 degrees apart.

3. A nail as described in claim 2 wherein said flutes are approximately one-half inch long.

4. A nail as described in claim 2 wherein said flutes are directionally tapered towards said head.

5. A nail as described in claim 2 wherein said flutes are approximately five-eights inch long.

6. A nail for securing a soft material layer to a solid surface, comprising a shaft, a circular head extending radially around said shaft, and two flutes situated on said shaft, each flute having an axially extending constant radius portion, said head having a substantially greater radial cross-sectional area than said flutes, and said flutes contacting said head and extending radially from the surface of said shaft a distance no greater than the radius of said head of said nail, the bottom edge of each flute being substantially perpendicular to said shaft and spaced apart from said nail head a distance approximately equal to the thickness of said soft material layer.

7. A nail as described in claim 6 wherein said two flutes are spaced about 180 degrees apart.

8. A nail as described in claim 7 wherein said flutes are approximately one-half inch in length.

9. A nail as described in claim 7 wherein said flutes are approximately five-eighths inch long.

* * * * *